United States Patent [19]

Kollie et al.

[11] Patent Number: 5,399,397
[45] Date of Patent: Mar. 21, 1995

[54] CALCIUM SILICATE INSULATION STRUCTURE

[75] Inventors: Thomas G. Kollie; Robert J. Lauf, both of Oak Ridge, Tenn.

[73] Assignee: Martin Marietta Energy Systems, Inc., Oak Ridge, Tenn.

[21] Appl. No.: 51,058

[22] Filed: Apr. 21, 1993

[51] Int. Cl.$^6$ ............... B32B 1/06; B32B 1/08; B32B 5/16
[52] U.S. Cl. ................. 428/35.4; 428/65; 428/69; 428/76
[58] Field of Search .......... 428/69, 76, 65, 35.4, 428/35.3; 220/901

[56] References Cited

U.S. PATENT DOCUMENTS 4,668,551 5/1987 Kawasaki et al. ................. 428/69

*Primary Examiner*—Alexander S. Thomas
*Attorney, Agent, or Firm*—Michael E. McKee; George L. Craig; J. Donald Griffin

[57] ABSTRACT

An insulative structure including a powder-filled evacuated casing utilizes a quantity of finely divided synthetic calcium silicate having a relatively high surface area. The resultant structure-provides superior thermal insulating characteristics over a broad temperature range and is particularly well-suited as a panel for a refrigerator or freezer or the insulative barrier for a cooler or a insulated bottle.

20 Claims, 2 Drawing Sheets

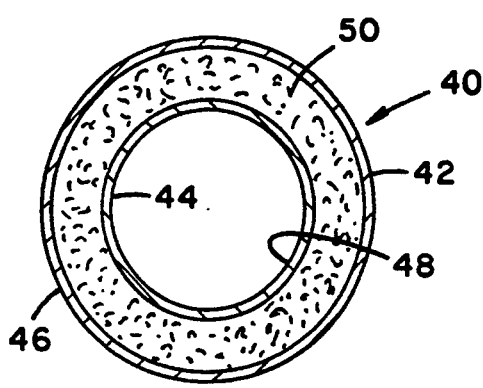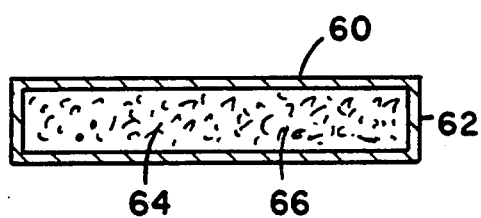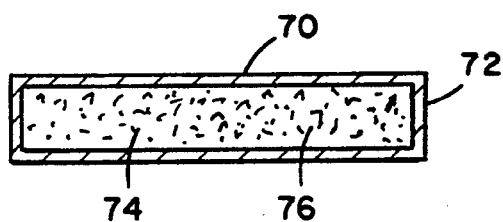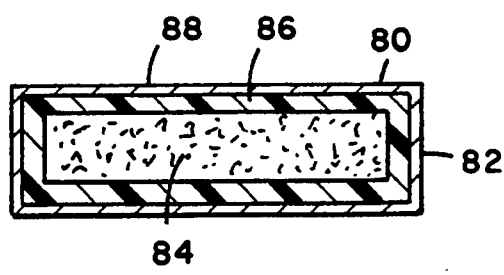

CALCIUM SILICATE INSULATION STRUCTURE

BACKGROUND OF THE INVENTION

This invention relates generally to insulative structures and relates, more particularly, to an evacuated insulation structure, such as a panel.

Evacuated insulation of the type with which this invention is concerned have been proposed for use as substitute insulation for foamed polymer materials commonly utilized in the walls and doors for enclosures of refrigeration and freezing equipment and insulative barriers enveloping portable insulated containers such as coolers and insulated bottles available under the trade designation Thermos.

By utilizing preselected powders as filler materials for such panels, the panels are provided with desirable insulation properties, and unlike some refrigeration insulation, do not release chlorofluorocarbons into the environment. U.S. Pat. No. 4,636,415 describes one evacuated structure containing powder in the form of precipitated silica, and U.S. Pat. No. 4,681,788 describes another evacuated structure containing a mixture of precipitated silica and fly ash. Precipitated silica is limited, however, in that it is relatively expensive and its thermal properties are less than optimum.

It is an object of the present invention to provide a new and improved powder-filled evacuated insulation structure of the aforedescribed class.

Another object of the present invention is to provide such a structure which utilizes powder which, when compared to precipitated silica, has superior thermal insulating characteristics over a broad temperature range and can be produced in bulk relatively economically.

SUMMARY OF THE INVENTION

This invention resides in an insulation structure including means defining an enclosure having an interior which has been substantially evacuated of gas and a quantity of finely divided synthetic calcium silicate contained within the enclosure interior.

BRIEF DESCRIPTION OF THE DRAWINGS

FIG. 4 is a transverse cross-sectional view of another embodiment within which features of the present invention are incorporated.

FIG. 5 is a transverse cross-sectional view of still another embodiment within which features of the present invention are incorporated.

FIG. 6 is a transverse cross-sectional view of yet another embodiment within which features of the present invention are incorporated.

FIG. 7 is a transverse cross-sectional view of a further embodiment within which features of the present invention are incorporated.

DETAILED DESCRIPTION OF AN ILLUSTRATIVE EMBODIMENT

Figure 1:
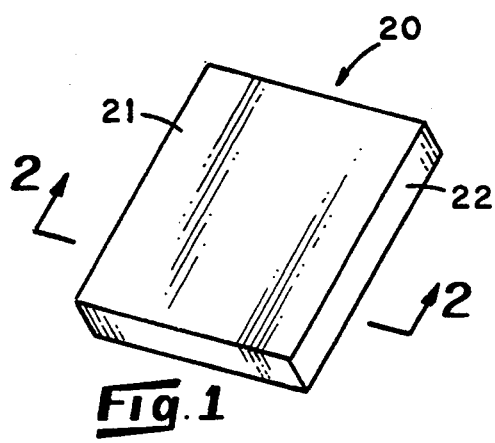
FIG. 1 is a perspective view of an insulation panel within which features of the present invention are incorporated.
Figure 2:
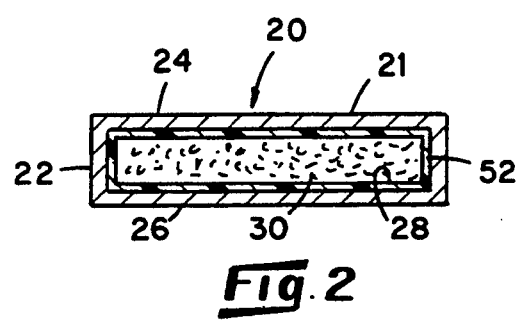
FIG. 2 is a cross section view of the FIG. 1 panel taken along line 2—2 of FIG. 1.

Turning now to the drawings in greater detail, there is illustrated in FIGS. 1 and 2 a substantially planar insulating structure, generally indicated 20, embodying various features of the present invention. The depicted structure 20 is of a type which can be used as an insulation panel which provides, with other insulated panels and an insulated door, the insulated enclosure of a refrigerator or freezer.

The structure 20 includes means, generally indicated 21, defining a enclosure having an interior which has been evacuated of gas. In the depicted embodiment 20, the enclosure-defining means 21 includes a casing 22 having two substantially air-impermeable walls 24, 26 which have been suitably joined together and sealed along the edges to provide a cavity 28 therebetween of substantially air-tight quality. Although the walls 24, 26 may be constructed of any of a number of suitable materials, the walls 24, 26 of the depicted embodiment 20 are constructed of steel, i.e. sheet metal steel.

The structure 20 also includes a quantity 30 of powdered synthetic calcium silicate positioned within so as to substantially fill the cavity 28. The synthetic calcium silicate comprising the quantity 30 is a well-known industry commodity formed by the reaction of diatomaceous earth and lime the presence of a catalyst at about 79° Celsius. The resulting powder is commonly used as a filler material in paints and foodstuffs. Because of its relatively high surface area and low density, the powder is also used as an absorbent.

As an aid in holding the quantity 30 of powdered calcium silicate within the cavity 28 during the casing evacuation process, the quantity 30 is contained within a pouch-like envelope 52 (FIG. 2) so that the walls of the envelope 52 separate the quantity 30 of powder from the walls 24 and 26 of the casing 22. The envelope 52 may be constructed of any of a number of microporous or semiporous materials, such as a polymer which is commercially available under the trade designation TYVEK from Du Pont. Alternatively, other types of paper, such as filter paper, can be employed. In general, any material which permits the passage of air and moisture but prevents the passage of the powdered calcium silicate therethrough can be used as the material for the envelope 52.

Preferably, the quantity 30 of calcium silicate is relatively dry to enhance the insulative quality of the powder. To this end, the quantity 30 has been heated in a pre-treatment operation to remove moisture therefrom. The quantity 30 may be heated to about 60° C., under vacuum, to remove adsorbed water associated with the powder and may be heated to about 400° C. to remove chemically-bound, i.e., absorbed, moisture associated with the powder. In general, the drier the quantity 30 of calcium silicate powder, the better the insulative quality of the powder.

Two grades of synthetic calcium silicate were tested and compared with test results with precipitated silica, the major constituent of the insulative materials described in each of U.S. Pat. Nos. 4,636,415 and 4,681,778. Each of the synthetic calcium silicate grades are manufactured by Celite Corporation, one of which is commercially available under the trade designation MicroCel E and the other of which is a further refinement of the Micro-Cel E grade referred to by Celite Corporation as H/A 80-20. The Micro-Cel E grade has a bulk density of about 5.8 pounds per cubic foot and a BET surface area of 120 square meters per gram while the H/A 80-20 grade is about the same phase (as that of the Micro-Cel E grade) but has about 30% more surface area than does Micro-Cel E.

For testing purposes, each powder was placed into a radial heat flow apparatus in order to measure its thermal conductivity at various gas pressures. No attempt was made during these tests to optimize the compaction of the powders or to expose the powders to atmospheric pressures, so the test results obtained should be read as a qualitative measure of the relative performance of each material. Moreover and to minimize the effects of adsorbed water on test results, the test apparatus was heated to and maintained at a temperature of 60° C. for at least twenty-four hours under a pressure of no greater than 0.1 mm Hg (mecury).

Figure 3:
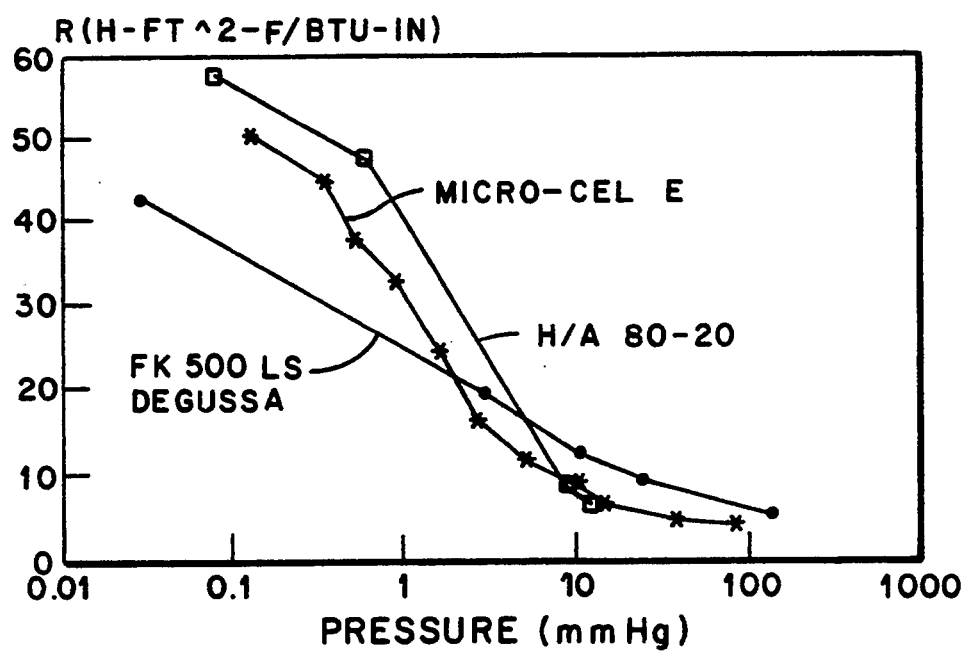
FIG. 3 is a graph illustrating comparative test data for various material powders.

FIG. 3 shows the results of the aforedescribed tests in terms of R-value versus pressure for the two calcium silicate materials and, for comparison, a precipitated silica (500LS Degussa) of the type specified in U.S. Pat. No. 4,636,415. From the FIG. 3 data, it can be seen that at pressures less than about 2 mm Hg, Micro-Cel E has better insulating properties than the precipitated silica. At pressures less than 5 mm Hg, the H/A 80-20 has better properties than the precipitated silica. The H/A 80-20 was expected to perform better than the Micro-Cel E grade because of its higher surface area, and the test results confirmed that expectation.

Because both powders are better than silica over part of the pressure range, it is believed that under optimal compaction, an insulating panel filled with either of the synthetic calcium silicate materials provide better insulation than does a panel filled with precipitated silica. Further still, although the materials were tested at about room temperature, logic dictates that the calcium silicate powder provides good insulative characteristics at temperatures above and below room temperature. Moreover, synthetic calciumsilicate has a relatively low cost and is available in great supply from domestic sources.

Still another advantage provided by an evacuated panel filled with synthetic calcium silicate powder relates to the insulating qualities of the powder itself. If, for example, the evacuated panel were to develop a leak and its internal pressure equalizes with that of the atmosphere, the panel still provides an effective insulation barrier because of the desirable insulation characteristics of the powder. Moreover, if such a leak in the panel were to develop, no chlorofluorocarbons are released into the environment, unlike the situation involving a leak in a refrigerant-filled panel.

It will be understood that numerous modifications and substitutions can be had to the aforedescribed embodiment without departing form the spirit of the invention. For example, although the structure 20 of FIGS. 1 and 2 has been shown and described as being substantially planar in form for use as a panel for the insulated enclosure of a refrigerator or freezer, a structure in accordance with the broader aspects of the invention may take an alternative form.

For example, there is illustrated in FIG. 4 an insulated structure 40 of cylindrical form for use, for example, as the insulative barrier of a insulated bottle. The structure has a ring-like enclosure 42 which is provided by an inner cylindrical wall 44 and an outer cylindrical wall 46 which are appropriately sealed to provide an interior cavity 48. Gas is evacuated from the cavity 48, and a quantity 50 of finely divided synthetic calcium silicate is contained within so as to fill the cavity 48.

Furthermore, although the aforedescribed embodiments 20 and 40 have shown and described as including quantities of calcium silicate which substantially fill the enclosures within which the quantities are contained, a structure embodiment in accordance with the broader aspects of the invention can include other powdered materials which have been mixed so as to blend with a quantity of powdered calcium silicate. For example, there is shown in FIG. 5 a structure 60 including an evacuated casing 62 within which is contained a mixture of a quantity 64 of powdered calcium silicate and a quantity 66 of an opacifier material, such as activated charcoal or carbon black. This quantity 66 of opacifier may be desired, for example, to render the structure 60 more opaque to infrared radiation. Similarly, there is shown in FIG. 6 a structure 70 including an evacuated casing 72 within which is contained a mixture of a quantity 74 of powdered calcium silicate and a quantity 76 of a getter material, known to preferentially absorb moisture or another atmospheric constituent. The choice of getter material may be preselected in order to preferentially absorb a specific atmospheric constituent.

Still further, although aforedescribed embodiments have been shown and described as including outer casings comprised of sheet metal, the casing of a structure may possess an alternative material. For example, there is shown in FIG. 7 an insulation structure 80 having an evacuated casing 82 for containing a quantity 84 of powdered calcium silicate and which includes walls comprised of a polymer film 86 which has been coated with a metalized layer 88. In the structure 80, the polymer film 86 contains the powdered quantity 84 during a casing evacuation process and the metalized layer 88 is a vapor barrier which maintains the vacuum conditions within the casing 82.

Accordingly, the aforedescribed embodiments are intended for purposes of illustration and not as limitation.

We claim:

1. An insulation structure comprising:
   means defining an enclosure having an interior which has been substantially evacuated of gas and has walls which provide low permeation of ambient gases into the interior of the structure; and
   a quantity of dried, finely divided synthetic calcium silicate contained within the enclosure interior wherein the calcium silicate is produced by a reaction of diatomaceous earth and lime and wherein the surface area of the powder is relatively high and at least about 120 square meters per gram.

2. The structure as defined in claim 1 wherein the synthetic calcium silicate has a bulk density of at least 0.093 grams per cubic centimeter (5.8 pounds per cubic foot).

3. The structure as defined in claim 1 wherein the shape of the structure is substantially planar.

4. The structure as defined in claim 1 wherein the cross-sectional shape of the structure is substantially ring-like in form so as to encircle a hollow interior and so that the structure provides an insulative barrier for the hollow interior.

5. The structure as defined in claim 1 wherein the synthetic calcium silicate is highly compacted within the enclosure interior.

6. The structure as defined in claim 1 wherein the quantity of synthetic calcium silicate substantially fills the enclosure interior.

7. The structure as defined in claim 1 wherein the synthetic calcium silicate is substantially free of adsorbed water.

8. The structure as defined in claim 1 wherein the synthetic calcium silicate is substantially free of chemically-bound water.

9. The structure as defined in claim 1 further comprising an envelope for enveloping the calcium silicate so that the calcium silicate is separated from the walls of the enclosure interior by the envelope material and wherein the envelope permits the passage therethrough of gas and water but prevents the passage therethrough of the calcium silicate.

10. The structure as defined in claim I further comprising a quantity of an opacifier mixed with the quantity of calcium silicate.

11. The structure as defined in claim 1 further comprising a quantity of a getter material mixed with the quantity of calcium silicate for preferentially absorbing moisture or another atmospheric constituent.

12. An insulation structure comprising:
enclosure means including two opposing walls joined together so as to provide an enclosure interior therebetween and which provide low permeation of ambient gases into the enclosure interior;
a quantity of dried finely divided synthetic calcium silicate positioned within so as to finely the enclosure interior and wherein the calcium silicate is produced by a reaction of diatomaceous earth and lime and has a relatively high surface area of at least about 120 square meters per gram; and
the enclosure interior is substantially evacuated of gas.

13. The structure as defined in claim 12 wherein the synthetic calcium silicate has a bulk density of at least 0.093 grams per cubic centimeter (5.8 pounds per cubic foot).

14. The structure as defined in claim 12 wherein the synthetic calcium silicate is highly compacted within the enclosure interior.

15. The structure as defined in claim 12 wherein said opposing walls include at: least a layer of sheet metal.

16. The structure as defined in claim 12 wherein said opposing walls include at least a layer of polymer.

17. The structure as defined in claim 16 wherein said opposing walls include a vapor barrier.

18. An insulation structure comprising:
a quantity of finely divided, relatively dry synthetic calcium silicate which is produced by a reaction of diatomaceous earth and lime and has a relatively high surface area of at least about 120 square meters per gram;
envelope means enveloping the quantity of calcium silicate and including walls which permit the passage of air and moisture therethrough but prevent the passage of the calcium silicate therethrough; and
means defining an enclosure having an interior within which the calciumsilicate-containing envelope means is positioned and which has been substantially evacuated of gas and which includes walls which provide low permeation of ambient gases into the interior of the enclosure means.

19. The structure as defined in claim 18 further comprising a quantity of an opacifier mixed with the quantity of calcium silicate.

20. The structure as defined in claim 18 further comprising a quantity of a getter material mixed with the quantity of calcium silicate for preferentially absorbing moisture or another atmospheric constituent.

* * * * *